United States Patent
Endoh et al.

(10) Patent No.: US 11,548,203 B2
(45) Date of Patent: *Jan. 10, 2023

(54) CONTINUOUS PRESS-MOLDING METHOD AND HEATING MACHINE THEREFOR

(71) Applicant: UNIPRES CORPORATION, Yokohama (JP)

(72) Inventors: Katsuhisa Endoh, Fuji (JP); Masato Usami, Fuji (JP)

(73) Assignee: UNIPRES CORPORATION, Yokohama-shi Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/046,015

(22) PCT Filed: Mar. 20, 2019

(86) PCT No.: PCT/JP2019/011670
§ 371 (c)(1),
(2) Date: Oct. 8, 2020

(87) PCT Pub. No.: WO2020/012722
PCT Pub. Date: Jan. 16, 2020

(65) Prior Publication Data
US 2021/0362397 A1    Nov. 25, 2021

(30) Foreign Application Priority Data
Jul. 9, 2018    (JP) .............. JP2018-129584

(51) Int. Cl.
*B29C 51/08*    (2006.01)
*B29C 48/305*    (2019.01)
*B29C 51/42*    (2006.01)

(52) U.S. Cl.
CPC .......... *B29C 51/082* (2013.01); *B29C 48/305* (2019.02); *B29C 51/42* (2013.01)

(58) Field of Classification Search
CPC ...... B29C 51/082; B29C 48/305; B29C 51/42
See application file for complete search history.

(56) References Cited

U.S. PATENT DOCUMENTS

2018/0334593 A1    11/2018   Shiga
2021/0362390 A1*   11/2021   Endoh ............... B29C 48/0022

FOREIGN PATENT DOCUMENTS

JP    S59-23691 A    2/1984
JP    H07-100349 A   4/1995
(Continued)

OTHER PUBLICATIONS

International Search Report with English translation and Written Opinion issued in corresponding application No. PCT/JP2019/011670 dated May 7, 2019.
(Continued)

*Primary Examiner* — Monica A Huson
(74) *Attorney, Agent, or Firm* — Foley & Lardner LLP

(57) ABSTRACT

A strip-shape softened resin sheet (S) which is continuously extruded from a molten resin extruder is cut to a unit resin sheet and a press molded product is manufactured by press-molding the unit resin sheet in a press-molding machine 20. Prior to press-molding the unit resin sheet (U) by the press-molding machine, the unit resin sheet (U) is heated by a heating machine 16. The heating machine 16 comprises a first heating furnace 84 and a second heating furnace 86. The first heating furnace 84 includes a series of heaters 84-3 and 84-4 whose heat source is infrared ray in a far-infrared region and the second heating furnace 86 includes a series of heaters 86-3 and 86-4 whose heat source is the infrared ray in a middle-infrared region. In the first furnace 84, the unit resin sheet (U) is continuously conveyed with a low velocity and is gradually heated by the far-infrared ray up to temperature which is slightly lower than the temperature which is suitable for press-molding the unit (Continued)

resin sheet (U). In the second furnace 86, the unit resin sheet (U) is stopped and is rapidly heated by the middle-infrared ray. By efficiently heating the unit resin sheet (U), a cycle time can be shortened and the production speed can be improved.

13 Claims, 11 Drawing Sheets

(56) References Cited

FOREIGN PATENT DOCUMENTS

| | | |
|---|---|---|
| JP | H10-286861 A | 10/1998 |
| JP | 2010-143152 A | 7/2010 |
| JP | 2010-179489 A | 8/2010 |
| WO | WO-2017/104731 A1 | 6/2017 |

OTHER PUBLICATIONS

U.S. Appl. No. 17/046,051, filed Oct. 8, 2020, Endoh.
International Search Report with English translation and Written Opinion issued in corresponding application No. PCT/JP2019/011658 dated Apr. 23, 2019.

* cited by examiner

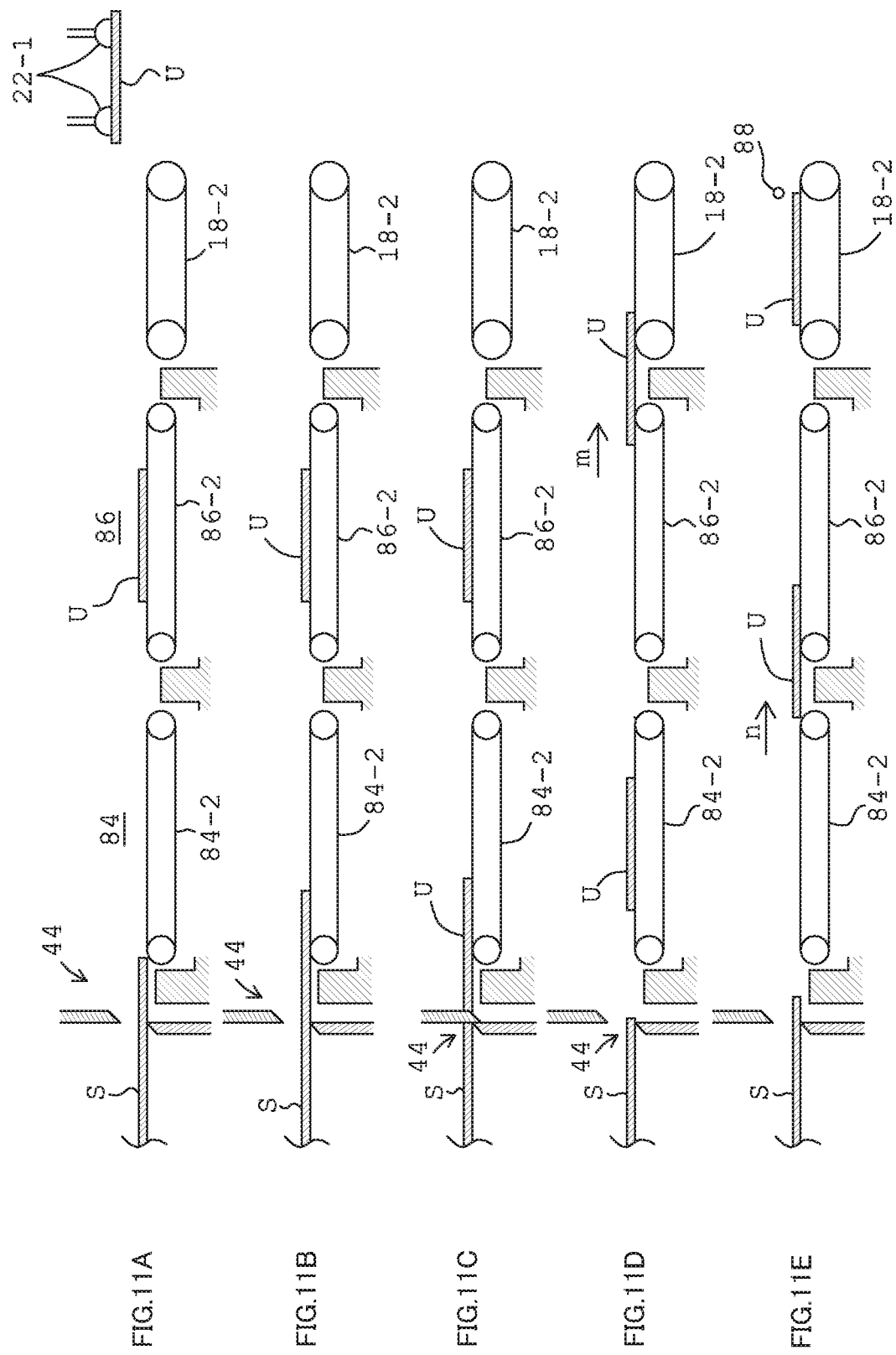

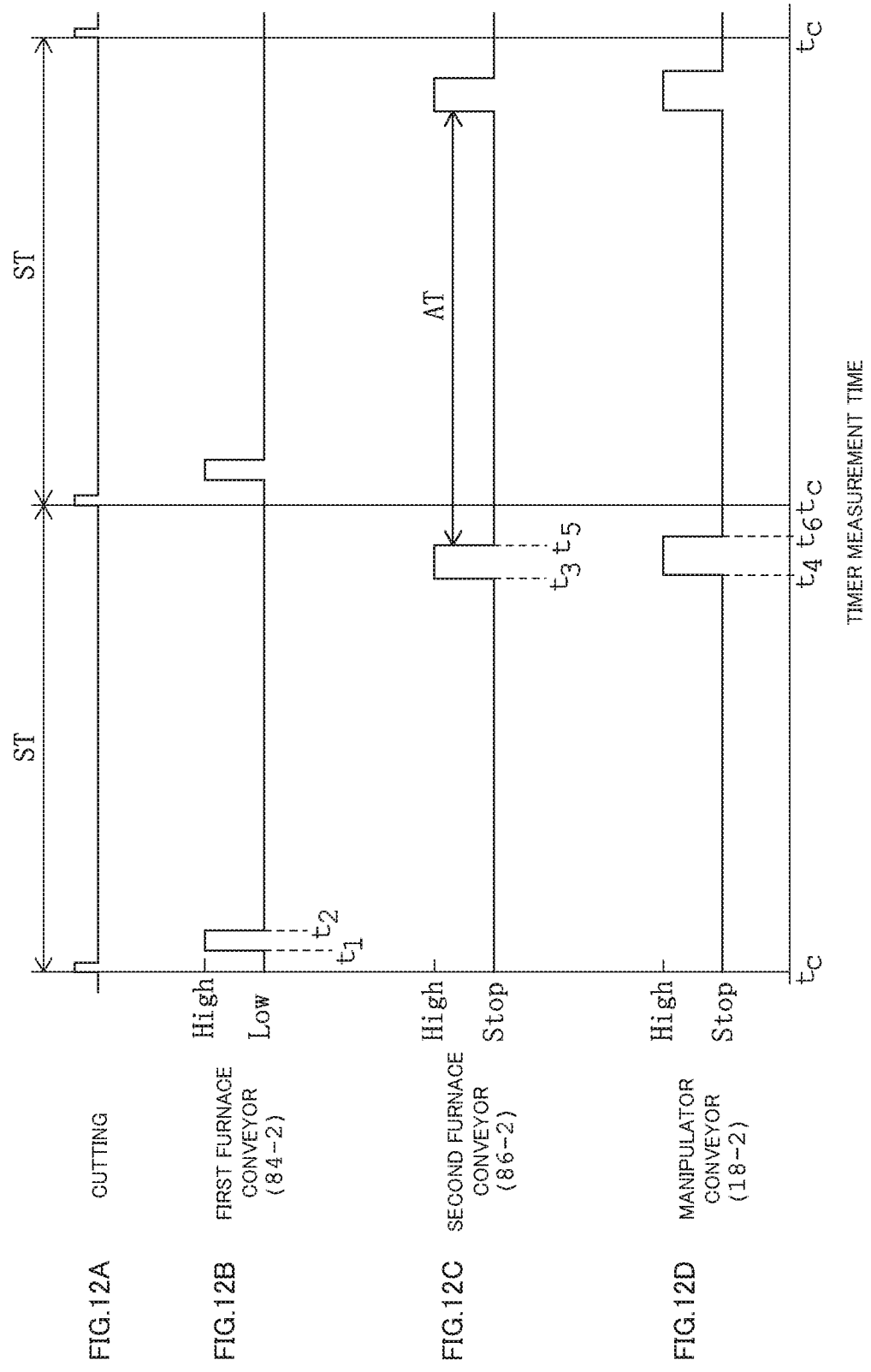

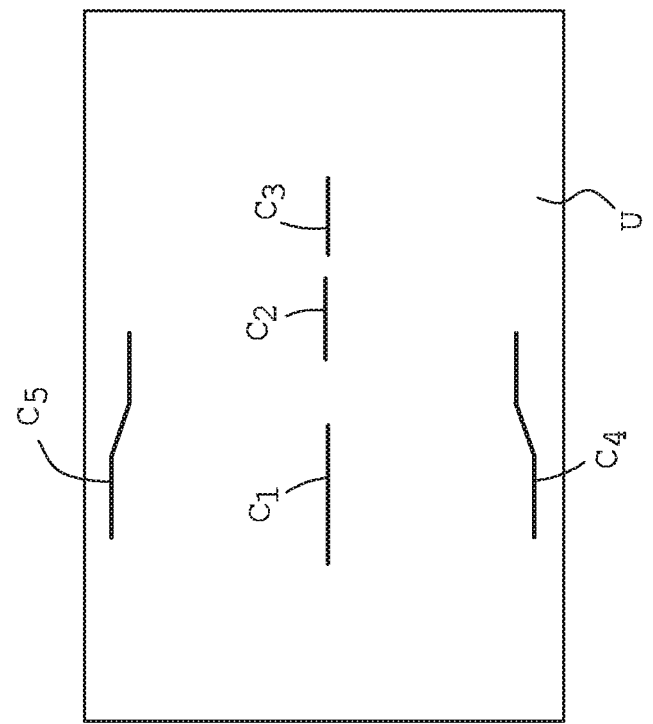
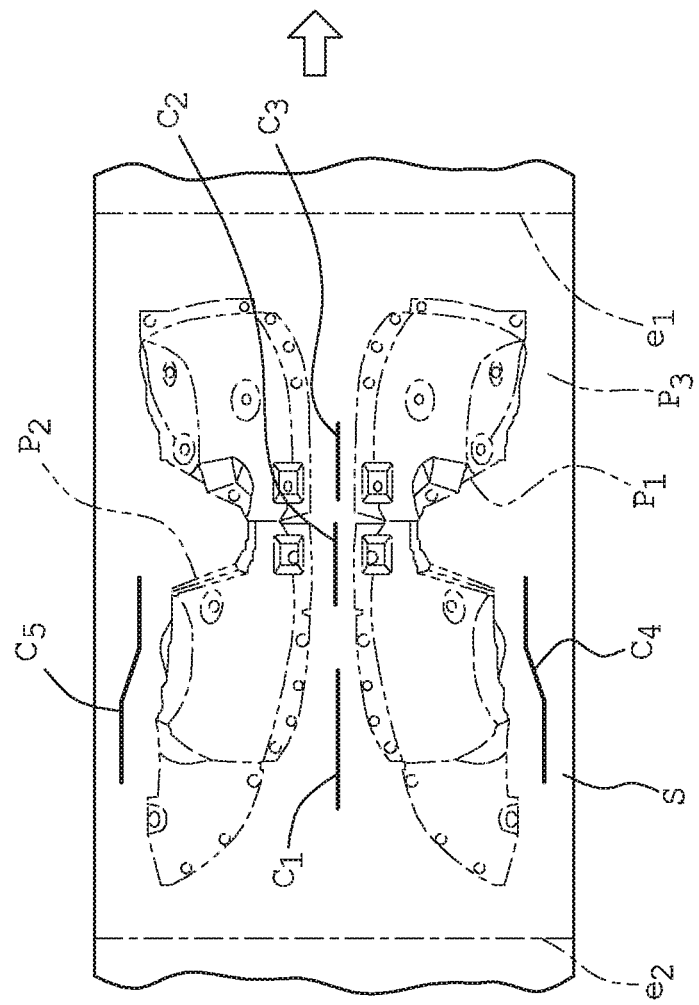

PRESENT INVENTION

CONTINUOUS PRESS-MOLDING METHOD AND HEATING MACHINE THEREFOR

TECHNICAL FIELD

The present invention relates to a method for obtaining a strip-shape softened resin sheet by extruding a molten resin from a die, cutting the strip-shape softened resin sheet to a unit of a resin sheet having a predetermined length, successively conveying the unit of the heated unit resin sheet to a press-molding machine and successively performing press-molding to the unit of the resin sheet by the press-molding machine, and to a heating machine of the unit resin sheet which is used for the above method.

BACKGROUND ART

The technology for forming a strip-shape softened resin sheet by extruding a molten resin from a die, making a unit of a resin sheet having a predetermined length by cutting the strip-shape softened resin sheet in a width direction, heating the unit resin sheet whose temperature decreases for cutting up to temperature suitable for press-molding, and performing a press-molding process to a press molded part of the heated sheet by a press-molding machine (conveying one unit resin sheet to a mold, press-molding the unit resin sheet by mold-clamping, mold-opening, ejecting a press molded product and the like), and the technique for continuously performing from melt-extruding of the resin to molding of the press molded part in one product-line by performing in synchronized with extruding the strip-shape softened resin sheet from the die, cutting the strip-shape softened resin sheet to the unit resin sheet, heating the cut unit resin sheet and press-molding the unit resin sheet, and obtaining the press molded product by cooling the ejected press molded part in a cooling apparatus and trimming an unnecessary part from the cooled press molded part (hereinafter, referred to as "a resin sheet continuous pressing method"), are proposed by the applicant (Patent Documents 1 and 2). An efficiency improvement in molding processes of the resin product by integrated manufacturing from the resin to the product in one product-line (cycle time reduction), an improvement in energy saving and cost reduction can be realized. Comparing with the molding method by injection, the pressing pressure which is required for the molding apparatus can be considerably smaller and the above molding method has an excellent feature in a cost reduction of the apparatus.

THE LIST OF PRIOR ART DOCUMENTS

Patent Documents

Patent Document 1: Japanese Examined Patent Publication No. S59-23691 B2
Patent Document 2: Japanese Examined Patent Publication No. H07-100349 B2

SUMMARY OF THE INVENTION

Problems to be Solved by the Invention

The resin sheet continuous pressing method is a method for performing a continuous process of the press molded part by cutting the continuous resin sheet extruded from the die to the unit resin sheet having a length suitable for press-molding by the press-molding machine, and conveying the heated and softened unit resin sheet to the press-molding machine. It is obvious that a certain amount of time is required for carrying-in the unit resin sheet, mold-opening, mold-clamping for press-molding, mold-opening and carrying-out the press molded part from the mold. As the common general technical knowledge of a person skilled in the art, it is thought that the cycle time for the resin sheet continuous pressing method (the time which is needed for manufacturing one press molded part) is determined by the time which is required for the pressing process. In actuality, the cycle time is determined by the time which is required for heating the unit resin sheet up to the temperature suitable for press-molding. That is, in a case of cutting the continuous resin sheet, when the resin temperature is high, the sheet is too soft and the smooth cutting of the sheet cannot be performed. Thus, it is required that the cutting to the unit resin sheet is performed after decreasing the temperature of the continuous resin sheet (for example, 120 degrees Celsius) by a temperature adjustment roller in the conveying path and the unit resin sheet is passed through a heating furnace in which the unit resin sheet is heated up to the temperature suitable for press-molding (for example, 150 degrees Celsius) prior to press-molding in the press-molding machine. Since it is difficult that the overall unit resin sheet is uniformly heated when the heating is rapidly performed by the heating furnace, the heating speed cannot become higher and a ceramic heater which radiates infrared ray whose wavelengths are, for example, in a range of 10 [µm] to 20 [µm] in a far-infrared region. In this case, in a case that the unit resin sheet whose area is 1000 [mm]×2000 [mm] and whose thickness is 1.6 [mm] is used, about 60 [sec] is needed to increase the temperature of the unit resin sheet up to 150 degrees Celsius which is suitable for the pressing process after cutting and this restricts the shortening of the cycle time. In a case of the unit resin sheet having the above size, the press-molding in the press-molding machine can be performed within 20 [sec], which is very short, in the current technology of the applicant. In order to improve the productivity by shortening the total cycle time, it is desired that the temperature uniformity is kept on the unit resin sheet and the heating time of the unit resin sheet is shortened. The present invention has been developed in view of the above-described problems of the prior art.

Means for Solving the Problems

A continuous press-molding method of the present invention comprising steps of: a forming process for forming a strip-shape softened resin sheet by extruding a molten resin from a die; a cutting process for cutting the strip-shape softened resin sheet to a unit of a resin sheet having a predetermined length; a unit resin sheet heating process for heating the unit of the resin sheet up to temperature which is suitable for press-molding; and a press-molding process for repeatedly performing a pressing process from the unit of the resin sheet to a press molded part which comprises steps of carrying the heated unit resin sheet to a press mold, press-molding the unit resin sheet to the press molded part by using the press mold and carrying the press molded part to a subsequent process in a cycle time, wherein the unit resin sheet heating process comprises steps of: a first heating process for gradually heating the unit resin sheet up to first temperature which is slightly lower than unit resin sheet temperature which is suitable for press-molding the unit resin sheet in a cycle time; and a second heating process for rapidly heating the unit resin sheet up to second temperature which is suitable for press-molding the unit resin sheet in a cycle time, after the first heating process.

In performing the present invention, the respective processes from the cutting process for cutting the unit resin sheet to the press-molding process are performed in a cycle time in a range of 15 [sec] to 25 [sec] in a case that a mixed resin of 40% to 60% of polypropylene resin and 60% to 40% of polyethylene resin is used as a material of the molten resin, temperature of the mixed resin when extruding is in a range of 190 degrees Celsius to 220 degrees Celsius, temperature of the resin sheet when cutting to the unit resin sheet is in a range of 115 degrees Celsius to 135 degrees Celsius, a size of the unit resin sheet is 700 [mm] to 1550 [mm]×1000 [mm] to 2300 [mm], temperature of the resin heated in the first heating process is in a range of 125 degrees Celsius to 135 degrees Celsius and temperature of the resin heated in the second heating process is in a range of 130 degrees Celsius to 160 degrees Celsius.

The gradual heating of the unit resin sheet in the first heating process can be performed under a situation that the unit resin sheet is continuously conveyed with velocity of 0.02 [m/s] to 1.0 [m/s] and the rapid heating of the unit resin sheet in the second heating process can be performed under a situation that the unit resin sheet is stopped. A heat source which radiates infrared ray whose wavelengths are in a range of 10 [μm] to 20 [μm] in a far-infrared region can be used for continuously heating the unit resin sheet in the first heating process and a heat source which radiates infrared ray whose wavelengths are in a range of 5 [μm] to 10 [μm] in a middle-infrared region can be used for rapidly heating the unit resin sheet in the second heating process.

A heating machine of the molten resin for performing the press-molding method according to the present invention can comprise: a first heating furnace to perform heating in the first heating process; and a second heating furnace to perform heating in the second heating process, wherein the first heating furnace is disposed at a heating chamber and the second heating furnace is disposed in said heating chamber; wherein each first and second heating furnaces comprises a conveyor to convey the unit resin sheet, and an infrared heater which is disposed in the heating chamber along a conveying path of the unit resin sheet. The conveyor of the first heating furnace comprises a first conveyor driving mechanism to perform low velocity movement of the unit resin sheet for gradually heating the unit resin sheet and perform rapid velocity movement for carrying-in the unit resin sheet to the first heating furnace, and the conveyor of the second heating furnace comprises a second driving mechanism to stop the unit resin sheet during heating, perform rapid velocity movement for carrying-in the unit resin sheet from the first heating furnace and perform rapid velocity movement for carrying-out the unit resin sheet to a press-molding machine side after heating.

Effects of the Invention

According to the present invention, in order to heat the unit resin sheet up to the temperature suitable for press-molding by the press-molding machine after cutting the continuous resin sheet to the unit resin sheet, the heating process divides into the first heating process for gradually heating for gradually heating the unit resin sheet up to the first temperature which is slightly lower than the unit resin sheet temperature which is suitable for press-molding the unit resin sheet in the cycle time, and the second heating process for rapidly heating the unit resin sheet up to the second temperature which is suitable for press-molding the unit resin sheet in the cycle time, after the first heating process. Although the number of the processes increases by one, adopting the two-stage heating that the overall unit resin sheet is heated keeping the temperature uniformity of the unit resin sheet by gradually heating in the first heating process and is rapidly heated in the second heating process, leads to largely shorten the time required for increasing up to the temperature suitable for press-molding without substantially losing the temperature uniformity of the unit resin sheet. Consequently, the cycle time can largely be shortened and an increase in the production efficiency and a reduction in the manufacturing cost can also be realized.

BRIEF DESCRIPTION OF THE DRAWINGS

In the accompanying drawings:

FIG. A is a perspective view of a molded part which is integrated with left and right fender protectors of a vehicle and is manufactured in a molding line in an embodiment of the present invention

FIG. 11A is a schematic view showing a state that the strip-shape softened resin sheet is conveyed to a first heating furnace in the heating machine, FIG. 11B is a schematic view showing a state that the strip-shape softened resin sheet is cut to a unit resin sheet, FIG. 11C is a schematic view showing a state that the unit resin sheet is heated in the first and second heating furnaces, FIG. 11D is a schematic view showing a state that the unit resin sheet is moved from the first heating furnace to the second heating furnace and FIG. 11E is a schematic view showing a state that the unit resin sheet is ejected from the second heating furnace and is conveyed to a press-molding machine;

FIG. 12A is a timing chart showing a cutting operation from the strip-shape softened resin sheet to the unit resin sheet, FIG. 12B is a timing chart showing an operation of the conveyor of the first heating furnace (the first furnace), FIG. 12C is a timing chart showing an operation of the conveyor of the second heating furnace (the second furnace) and FIG. 12D is a timing chart showing an operation of a manipulator for ejecting the press molded part "P";

FIG. 13A is a top view showing a state that the slits are formed on the strip-shape softened resin sheet by the slit forming machine and a position relationship between the slits and the press molded part and FIG. 13B is a top view showing the unit resin sheet which is cut from the strip-shape softened resin sheet; FIG. 14A shows the thickness of the vertical wall portion in the prior art and FIG. 14B shows the thickness of the vertical wall portion in the present invention.

MODE FOR CARRYING OUT THE INVENTION

Figure 1:
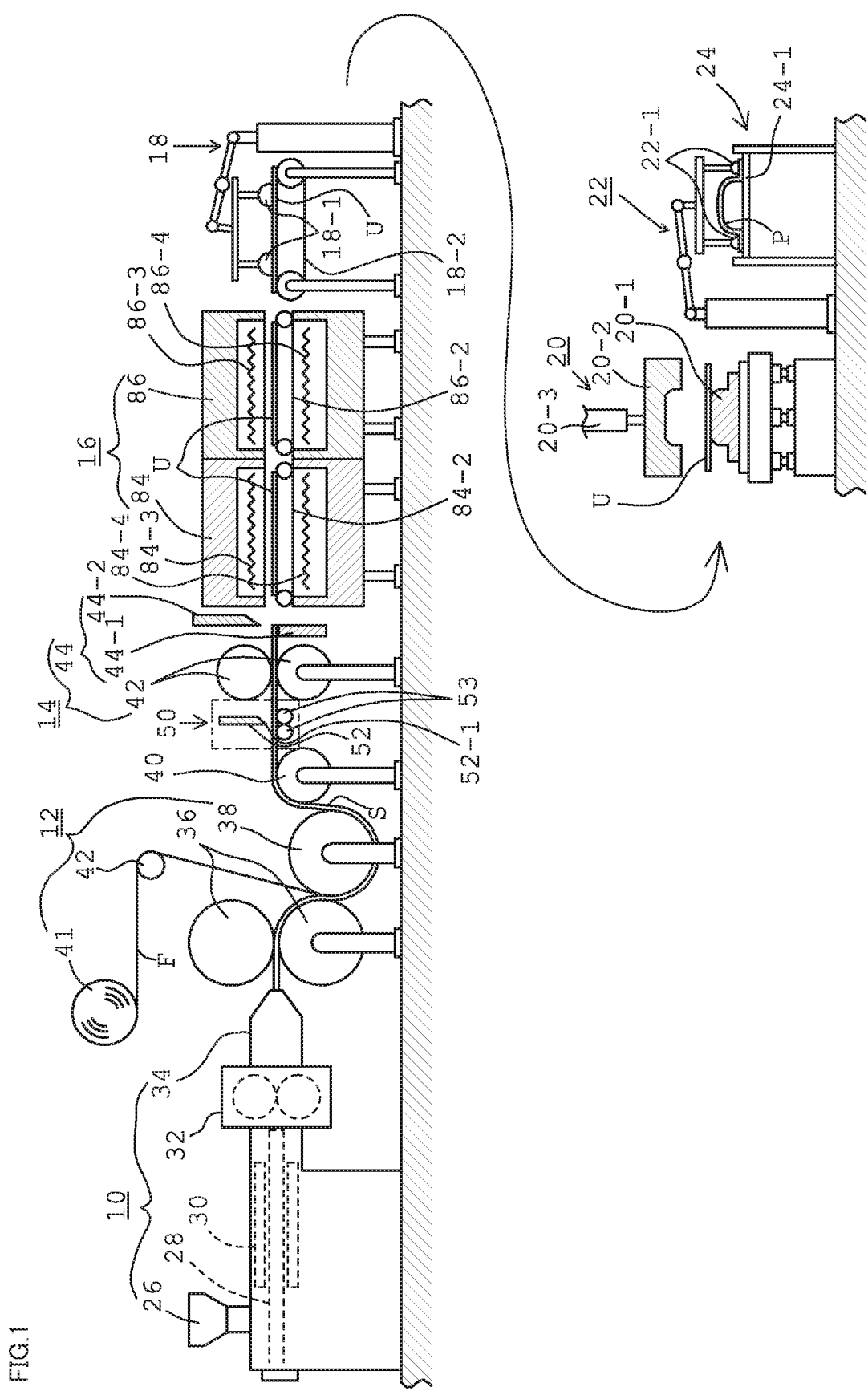
FIG. 1 is a schematic view of a molding line from a molten resin to a molded product in an embodiment of the present invention.

An embodiment of the present invention will be described. FIG. 1 shows a molding line from a molten resin to a molded product in the embodiment of the present invention. A molten resin extruder 10, a roller array 12 to pull out a strip-shape softened resin sheet "S" from the molten resin extruder 10 and control the temperature of the strip-shape softened resin sheet "S", a cutting unit 14 to cut the strip-shape softened resin sheet "S" to a softened unit resin sheet "U" (hereinafter, referred to as a unit resin sheet "U") which is a material for one press molded part by press-molding (in the present embodiment, as described below, one press molded part comprises a portion which becomes a pair of left and right resin fender protectors of the vehicle body as a product and a rest portion which becomes a scrap), a heating machine 16 to heat the unit resin sheet "U" up to a temperature suitable for press-molding with two stages, a manipulator (a robot) 18 to handle the unit resin sheet "U" whose temperature is controlled to the temperature suitable for press-molding by the heating machine 16, and a press-molding machine 20 to press-mold the unit resin sheet "U" ejected from the heating machine 16 by the manipulator 18 and make the press molded part, are disposed along a molding line. Further, a manipulator 22 to eject the press molded part "P" which is press-molded by the press-molding machine 20 and a post-process line 24 for the press molded part "P" molded by the press-molding machine 20 are disposed in a downstream side of the molding line.

Although the explanation order is different from a sequence of the molding line, the press-molding machine of the unit resin sheet "U" whose temperature is controlled by the heating machine 16 will be described. The press-molding machine 20 comprises a male mold 20-1 and a female mold 20-2. In a mold-opening state, the manipulator 18 holds the unit resin sheet "U" which is heated up to the temperature suitable for press-molding by the heating machine 16, by a suction cup 18-1, and sets the unit resin sheet "U" to a predetermined position between the male mold 20-1 and the female mold 20-2 in the mold-opened press molding machine 20. When the unit resin sheet "U" is set to the press molding machine 20, the female mold 20-2 downwardly moves to the male mold 20-1 by the hydraulic cylinder 20-3, the unit resin sheet "U" is shaped to the press molded part depending on the mold cavity by mold-clamping, the cooling is performed in the mold for a while, the female mold 20-2 upwardly moves and separates from the male mold 20-1 by mold-opening, the press molded part "P" is ejected from the press molding machine 20 by the suction cup 22-1 and is mounted on the conveyor 24-1 of the post-process line 24. The illustration is omitted since the post process is deviated from the main object of the present invention. In the post process line 24, the press molded part "P" is conveyed by the conveyor 24-1 and is cooled by a cooling machine, the cooled press molded part "P" is separated to a portion which becomes a product (a pair of left and right resin fender protectors of the vehicle body in the embodiment of the present invention) and a rest portion which becomes a scrap, and the post process (chipping) for recycling is performed to the portion which surrounds the product and becomes a scrap.

In the continuous molding line for extruding the strip-shape softened resin sheet "S" of the present invention, cutting from the strip-shape softened resin sheet "S" to the unit resin sheet "U" by the cutting machine 44, heating the unit resin sheet "U" by the heating machine 16 and press-molding the heated unit resin sheet "U" by the press molding machine 20 and obtaining the press molded part, the cycle time "ST" is a time which is required for molding one press molded part. As the common general technical knowledge of a person skilled in the art, the cycle time "ST" is determined by the time which is required for a series of processes for mold-opening in the press molding machine 20, setting the unit resin sheet "U" from the manipulator 18, press-molding of the press molded part by mold-clamping, mold-opening and ejecting the press molded part by the manipulator 22. However, in the resin sheet continuous pressing method, the resin temperature decreases for cutting the strip-shape softened resin sheet "S" to the unit resin sheet "U" and the temperature of the unit resin sheet "U" needs to increase up to the temperature suitable for press-molding and keep the temperature uniformity. Conventionally, since the time for increasing the temperature is needed, the cycle time is restricted by the time which is required for the heating process of the unit resin sheet "U". In the present invention, shortening the heating time is possible because of improving the heating machine 16. Thereby, shortening of the cycle time "ST" can be achieved. Synchronizing with this setting cycle time "ST", the strip-shape softened resin sheet "S" is extruded from the molten resin extruder 10, the strip-shape softened resin sheet "S" is cut to the unit resin sheet "U" by the cutting unit 14 described below, and the temperature control of the unit resin sheet "U" is performed by the heating machine 16. Accordingly, in this time, the substantial retention of the strip-shape softened resin sheet "S" which is continuously extruded from the molten resin extruder 10 is not occurred and the waiting time for substantial arrival of the unit resin sheet "U" at the press-molding machine 20 is not occurred.

Figure 2A:
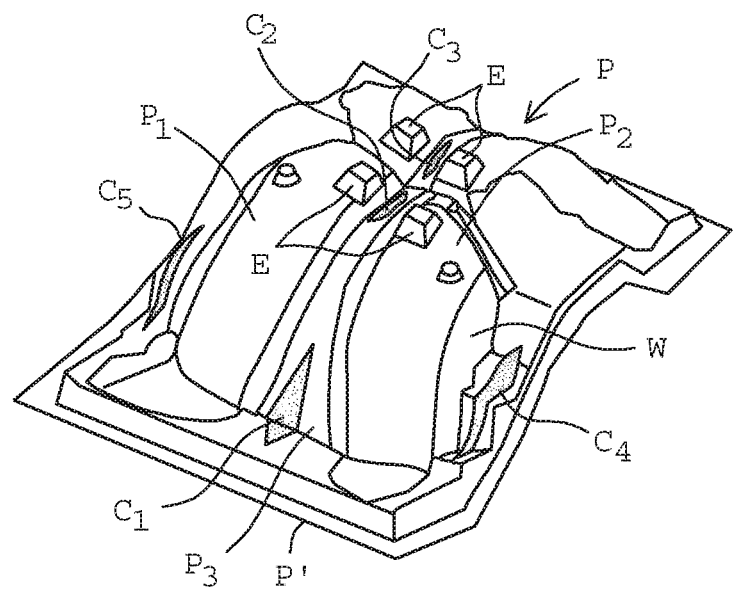
FIG. 2B is a perspective view of the left and right fender protectors of the vehicle obtained from the molded part.
Figure 2B:
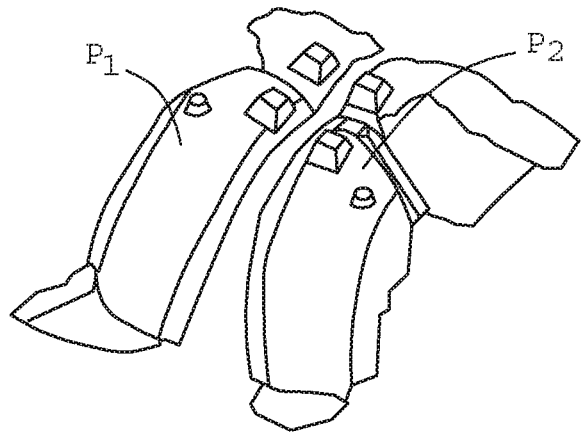
Figure 3:
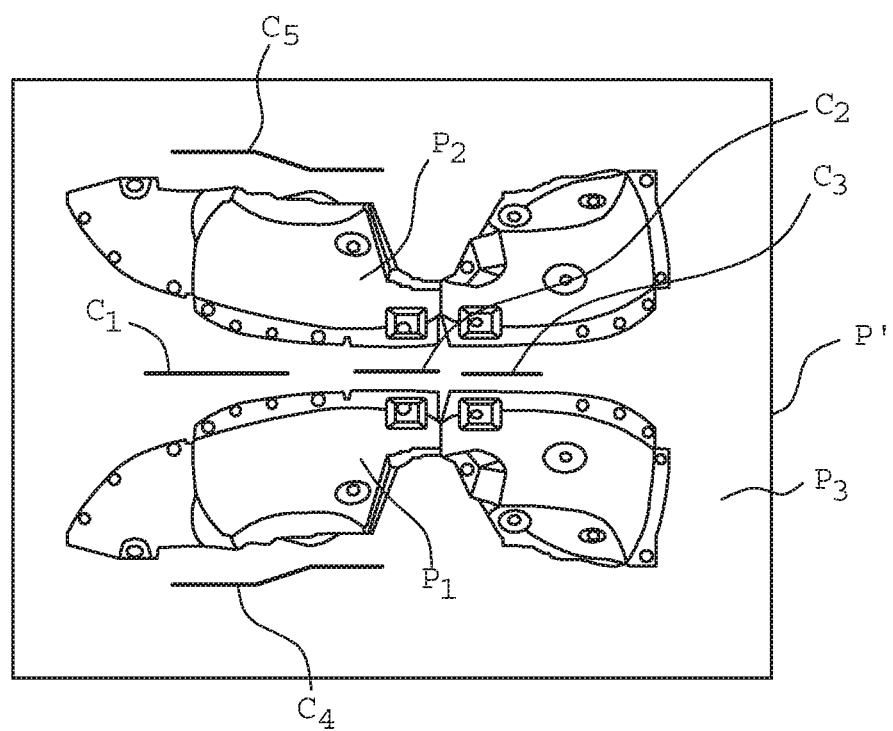
FIG. 3 is a plan view of the molded part of FIG. 2A.

Next, one example of the particular structure of the press molded part "P" which is press-molded from the unit resin sheet "U" by the press-molding machine 20 in the molding line will be described. FIG. 2A is a perspective view of the press molded part "P" and FIG. 3 is a plan view of the press molded part "P". The press molded part "P" is integrated with left and right fender protectors for front wheels of the vehicle by press-molding the unit resin sheet "U". The reference numerals $P_1$ and $P_2$ denote the portions of the left and right fender protectors which are obtained from the press molded part "P" and these portions $P_1$ and $P_2$ have a high vertical wall "W". It is understood that the embossment portions "E" which serves as pedestals of bolts for assembling to the vehicle body are disposed on the upper surface of the vertical wall. FIG. 3 is a plan view of the press molded part "P" and the outline shape of the portions $P_1$ and $P_2$ which become the fender protectors is well understood. The portion $P_3$ of the press molded part "P" which is ranged from the outside of the portions $P_1$ and $P_2$ which become the fender protectors to an outer circumference P' of the press molded part "P" is removed and becomes a scrap. As described below, according to the present embodiment of the present invention, the slits $C_1$, $C_2$, $C_3$, $C_4$ and $C_5$ along the portions "W" which become the vertical walls of the product and the portions "E" which become the embossments of the product in a state of the strip-shape softened resin sheet before cutting to the unit resin sheet "U" are formed on the portion $P_3$ which becomes a scrap. By forming the slits $C_1$, $C_2$, $C_3$, $C_4$ and $C_5$ on the strip-shape softened resin sheet, the inflow property of the resin is improved at the portions "W" which become the vertical walls and the portions "E" which become the embossments (these portions become a thin thickness in the deep drawing and the like) in press-molding the unit resin sheet "U" by the press-molding machine 20, the thickness of the product becomes a good uniformity and the product quality can be improved. FIG. 2B schematically shows a state that the portion $P_3$ which becomes a scrap is removed and the press molded part is separated to the left and right fender protectors as a product. In FIG. 1, for convenience, the male mold 20-1 and the female mold 20-2 in the press-molding machine 20 are depicted by a diagrammatic sketch. The actual mold surfaces of the male mold 20-1 and the female mold 20-2 are corresponding to the shape of the press molded product of FIGS. 2A and 2B.

Next, in FIG. 1, the configurations of respective portions until press-molding is performed in the molding line, that is, until the temperature-controlled unit resin sheet "U" is manufactured will be described. The molten resin extruder 10 itself is a well-known machine and is briefly described. The molten resin extruder 10 comprises a hopper 26 for feeding resin pellets, a screw extruder 28, a heater 30, a gear pump 32 and a die (an extrusion nozzle) 34. In this embodiment, the resin material is mixed with polypropylene and polyethylene and the pellets of polypropylene and polyethylene which have the predetermined mixing rate are fed into the hopper 26. The screw extruder 28 mixes the pellets and conveys the pellets to the axial direction and the pellets are molten and are mixed by heat of the heater 30. The gear pump 32 conveys the molten and mixed resin to the die 34 at a constant velocity and the molten and mixed resin is extruded as the strip-shape softened resin sheet "S" from the die having an elongated rectangular cross section. The resin temperature when extruding is in a range of 190 degrees Celsius to 220 degrees Celsius in a case of the resin of the present embodiment that is composed of about 50 weight percent of polypropylene and about 50 weight percent of polyethylene.

The roller array 12 comprises a pair of sheet pull-out roller pair 36, a temperature-controlled roller 38 and 40. The molten resin from the die 34 is temperature-controlled by passing through the sheet pull-out roller pair 36 and the temperature-controlled rollers 38 and 40. The preferable temperature range that the cutting unit 14 cuts the strip-shape softened resin sheet "S" to the unit resin sheet "U" is about 115 degrees Celsius to about 135 degrees Celsius. When this temperature is too high, there exists an inconvenience that the strip-shape softened resin sheet "S" becomes too soft and the cutting unit 14 cannot cut the strip-shape softened resin sheet "S". In order to smoothly operate the formation of the slits by the silt forming machine 50 in the embodiment of the present invention, it is preferable that the temperature of the unit resin sheet "U" before cutting is set to a suitable temperature so that the unit resin sheet "U" before cutting does not become too soft. The roll 41 of a laminate film (such as the nonwoven film having a thickness in a range of about 0.5 [mm] to about 5.0 [mm]) is disposed at an upper position, the laminate film "F" from the roll 41 is combined with the strip-shape softened resin sheet "S" at the temperature-controlled roller 38 and the laminate film "F" is on the surface of the strip-shape softened resin sheet "S" at the outlet of the temperature-controlled roller 38.

The cutting unit 14 comprises a pinch roller pair 42 and a cutting unit 44. The cutting unit 44 is disposed at an outlet of the pinch roller pair 42 and includes a pair of a lower fixed cutter 44-1 and an upper moving cutter 44-2. The fixed cutter 44-1 and the moving cutter 44-2 have a cutting portion whose length is longer than a total width of the strip-shape softened resin sheet "S". In a normal state, the moving cutter 44-2 is in a retraction position which is upwardly separated from the fixed cutter 44-1. Every time the strip-shape softened resin sheet "S" is passed with a constant length, the moving cutter 44-2 is instantaneously and downwardly moved to the fixed cutter 44-1 and is immediately and upwardly driven to return to the retraction position, the strip-shape softened resin sheet "S" is cut to the unit resin sheet "U" having a constant length, and the unit resin sheet "S" is conveyed to the heating machine 16. With respect to the cutting unit 14, if necessary, the readers are also referred to the description of Patent Document 1.

Figure 4:
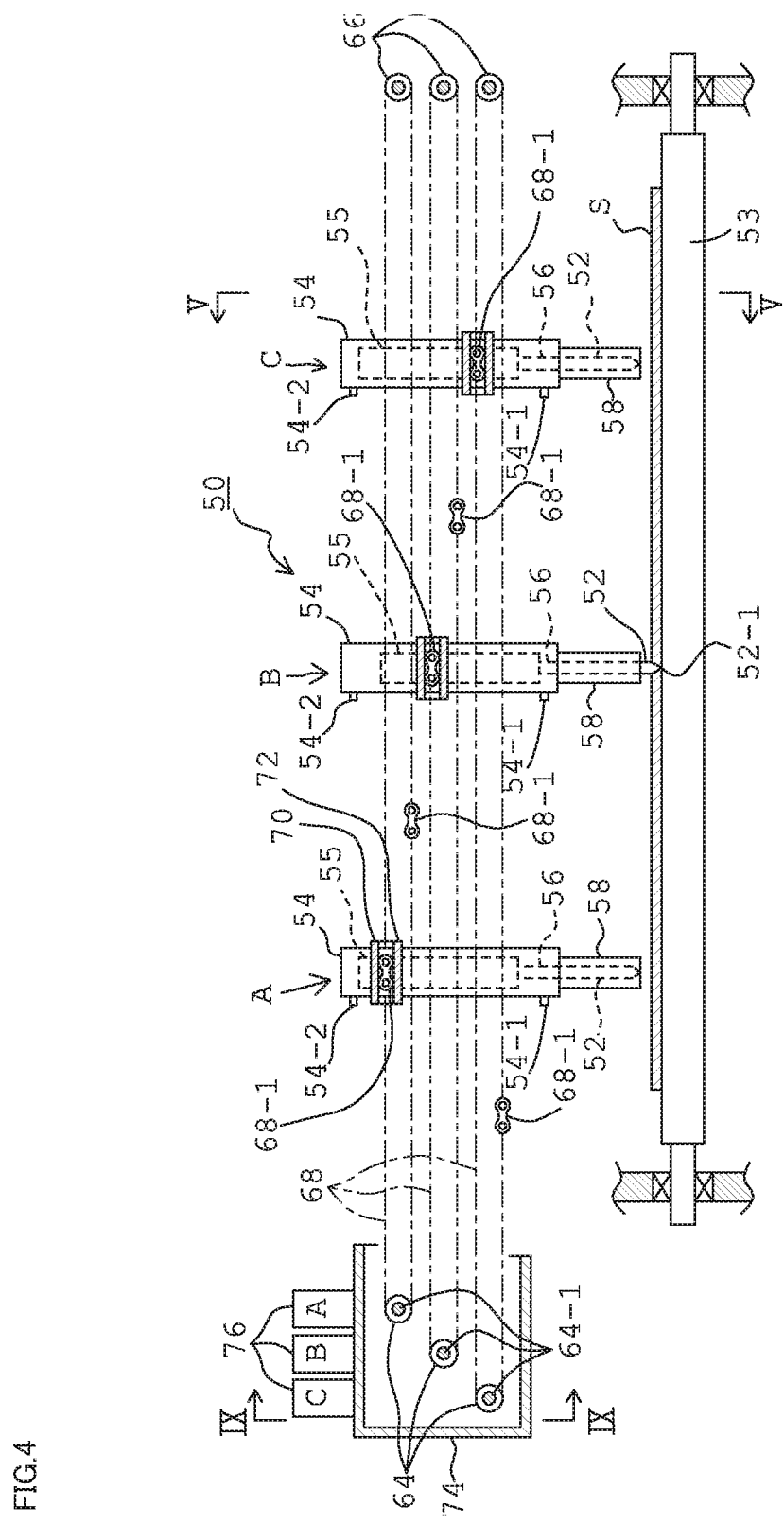
FIG. 4 is a front view of a slit forming machine which forms slits on a strip-shape softened resin sheet (a front view viewed from a longitudinal direction of the continuous sheet) (FIG. 4 is a diagram substantially taken along an arrow IV-IV in FIG. 5)
Figure 5:
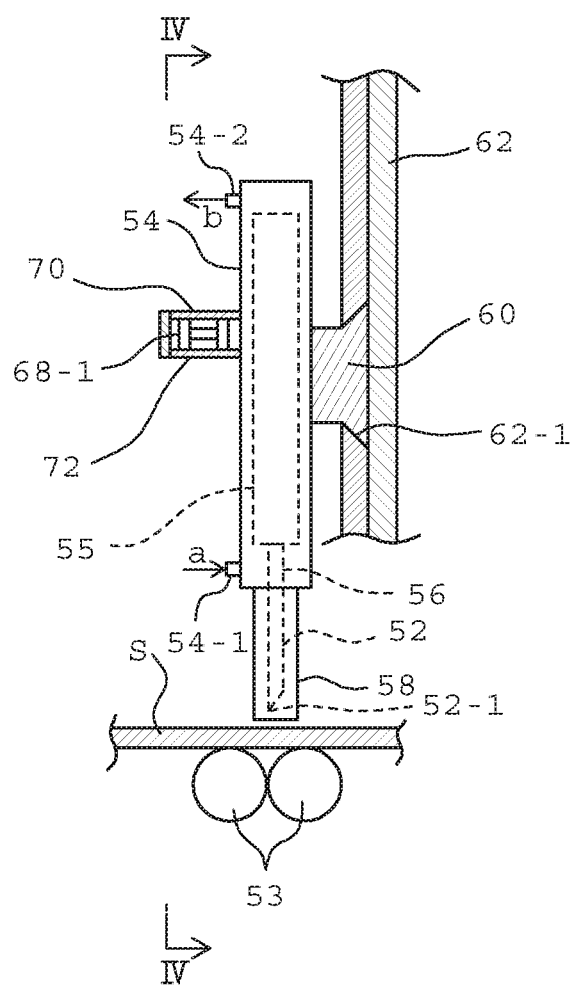
FIG. 5 is a diagram of one air cylinder of the slit forming machine viewed from a direction perpendicular to the longitudinal direction of the strip-shape softened resin sheet (a diagram taken along an arrow V-V in FIG. 4)
Figure 6:
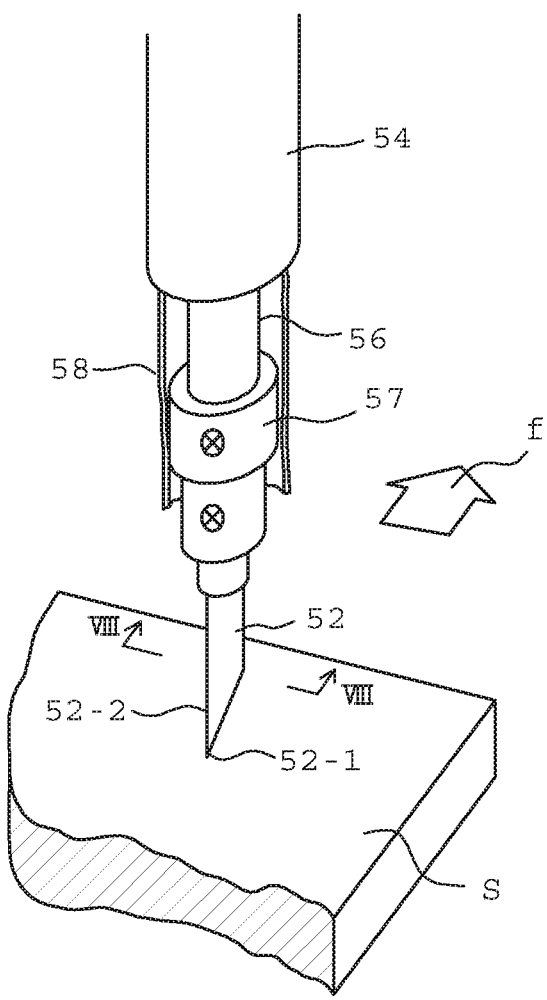
FIG. 6 is a perspective view schematically showing a state that a cutter connected to the piston rod of one air cylinder prepares to form the slit on the continuous sheet.
Figure 8:
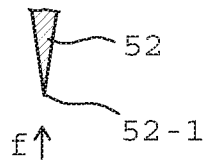
FIG. 8 is a schematic cross-sectional view of a cutter face of the cutter (a cross-sectional view taken along an arrow VIII-VIII in FIG. 6)

The slit forming machine 50 for forming the slits $C_1$, $C_2$, $C_3$, $C_4$ and $C_5$ at the portion which is become to a scrap in the molded product which is described in FIGS. 2 and 3 is disposed at the front of the pinch roller 42 in the cutting unit 14 (see also, FIG. 13). The structure of the slit forming machine 50 will be described below. As shown in FIG. 4, the slit forming machine 50 comprises three cutters 52 in a width direction of the strip-shape softened resin sheet "S". As described below, the three cutters 52 can independently move to the upward or downward direction and the width direction. In a case that the distinction is needed, the left cutter in FIG. 4 is represented by "A", the center cutter in FIG. 4 is represented by "B" and the right cutter in FIG. 4 is represented by "C". As shown in FIG. 5, a cutting edge 52-1 of the three cutters 52 is disposed between a pair of rollers 53 which are the receiving portion of the strip-shape softened resin sheet "S" when forming the slits. As described below, when the three cutters 52 for forming the slits downwardly move, the sharp cutting edge 52-1 penetrates the strip-shape softened resin sheet "S". As schematically shown in FIG. 6, each three cutters 52 is detachably installed to the lower end of the piston rod 56 extending from the piston 55 (in FIG. 5) of the air cylinder 54. Normally, each three cutters 52 is covered by a safety cover 58, and the cutting edge 52-1 protrudes from the safety cover when forming the slits. FIG. 4 shows a state that the cutter 52 of the center portion "B" penetrates the strip-shape softened resin sheet "S" and the cutters 52 of the left side "A" and the right side "C" are covered by the safety covers 58. The air cylinder 54 urges the piston 55 to the upper portion of FIG. 4 and each three cutters 52 is housed in the safety cover 58. That is, in FIG. 5, the piston 55 upwardly moves by the air pressure introducing from the lower air pressure port 54-1 of the air cylinder 54 (an arrow "a" direction in FIG. 5) and the air pressure exhausting from the upper air pressure port 54-2 of the air cylinder 54 (an arrow "b" direction in FIG. 5) and a state that the cutting edge 52-1 is housed in the safety cover 58 is shown. In contrast with FIG. 5, the piston 55 downwardly moves by the air pressure introducing from the upper air pressure port 54-2 of the air cylinder 54 (an opposite direction of the arrow "b" in FIG. 5) and the air pressure exhausting from the lower air pressure port 54-1 of the air cylinder 54 (an opposite direction of the arrow "a" in FIG. 5), the cutting edge 52-1 protrudes from the safety cover 58, and the slits can be formed on the strip-shape softened resin sheet "S". FIG. 8 shows a horizontal cross-sectional shape of the cutter 52 at the intermediate height. In order that the cutting portion 52-2 which is continued to the lower cutting edge 52-1 is opposite to the moving direction of the strip-shape softened resin sheet "S" (an arrow "f") and the cutter 52 easily penetrates the strip-shape softened resin sheet "S" for forming the slits, the cutting edge 52-1 has a sharp shape.

Next, the support structure of the air cylinder 54 will be described. As shown in FIG. 5, a horizontal moving member 60 is fixedly disposed on the back surface of the body of the air cylinder 54. The support member 62 is uprightly disposed on the back surface of each three air cylinders 54 in FIG. 4 and forms a guide path 62-1 for guiding the horizontal movement of the horizontal moving member 60. In other words, each air cylinders 54 and each cutters 52 can independently move in the horizontal direction. For simplification, the mechanisms 60 and 62 for the horizontal movement of the air cylinders 54 are depicted by a diagrammatic sketch. The guide mechanism including the commercially available linear bearings can be used in the mechanisms 60 and 62 and precise horizontal position control of the air cylinders 54 can be performed by light driving force.

Figure 7:
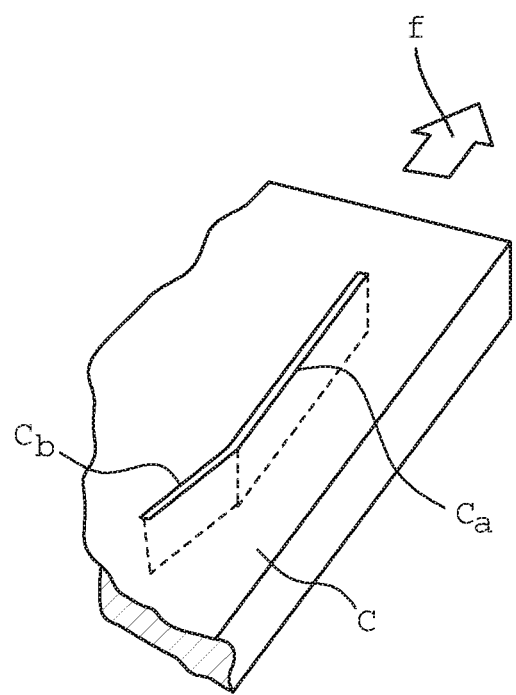
FIG. 7 is a perspective view schematically showing a state that the slit was formed on the strip-shape softened resin sheet.
Figure 9:
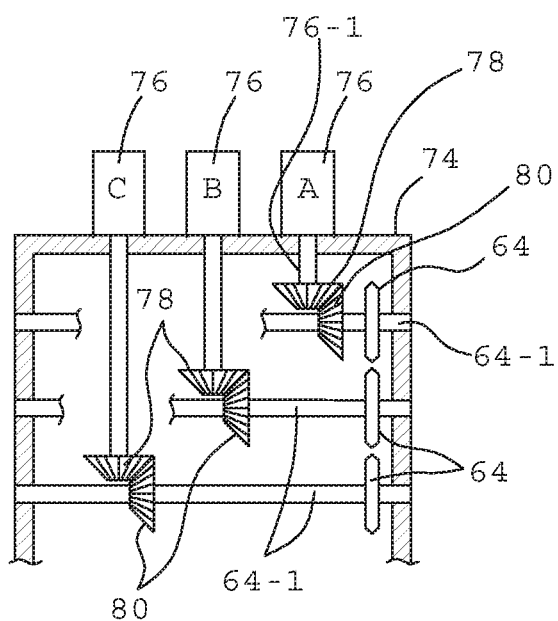
FIG. 9 is a schematic cross-sectional view of a gear box of the slit forming machine (a cross-sectional view taken along an arrow IX-IX in FIG. 4)

Next, a chain-type driving mechanism for independently occurring the horizontal movement of each air cylinders 54 will be described. In FIG. 4, looped chains 68 are wound around sprocket wheel pair 64 and 66 which are located at both ends above the strip-shape softened resin sheet "S". In order to independently move the three air cylinders 54 in the horizontal direction, the three looped chains 68 are disposed. Corresponding to the respective three looped chains 68, three sprocket wheel pairs 64 and 66 are also disposed. The sprocket wheels 64 are served as a driving side and the sprocket wheels 66 are served as a driven side. For simplification, one chain pitch 68-1 is depicted in an upper lane and a lower lane of the respective looped chains 68. As well-known, one looped chain 68 is constituted by connecting one chain pitch 68-1 using a pin. For simplification, only one chain pitch 68-1 of the plural upper side chain pitches and one chain pitch 68-1 of the plural lower side chain pitches in one looped chain 68 are shown in FIG. 5. This one chain pitch 68-1 is fixed to the corresponding air cylinder 54 and one air cylinder 54 which is fixed to the looped chain 68 can move in the horizontal direction. That is, in FIG. 5, upper and lower bracket plates 70 and 72 are fixed to the outer surface of the air cylinder 54 which is opposite to the support member 62 (the front surface side) by welding or the like in a cantilever manner. One chain pitch 68-1 (if necessary, a few adjacent chain pitches) of one looped chain 68 is fixed to a portion between the bracket plates 70 and 72 by welding or the like. Thereby, a horizontal driving force can be applied to the air cylinder 54 by the looped chain 68. As shown in FIG. 9, the driving side sprocket wheel 64 is supported in a gear box 74 by an axis 64-1, and the rotation of the rotational axis 76-1 of the servo motor 76 can be transmitted to the driving side sprocket wheel 64 via a pair of bevel gears 78 and 80. The rotation of the rotational axis 76-1 of the servo motor 76 is transmitted to the looped chain 68 via the driving side sprocket wheel 64, the air cylinder 54 in which the horizontal moving member 60 is guided to the support member 62 horizontally moves in a width direction of the strip-shape softened resin sheet "S" and the cutting edge 52-1 of the cutter 52 can accurately be controlled to the width direction position in the strip-shape softened resin sheet "S". The three servo motors 76 for independently and horizontally driving the three looped chains 68 are disposed. Corresponding to the reference numerals "A", "B" and "C" in the air cylinders 54 of FIG. 4, the servo motors 76 are represented by the reference numerals "A", "B" and "C". Thus, the three air cylinder 54A, 54B and 54C can independently and horizontally move in the width direction of the strip-shape softened resin sheet "S" by the servo motors 76A, 76B and 76C. The precise position control (the servo control) in the width direction of the strip-shape softened resin sheet "S" in the cutting edge of the cutter 52 can be performed and the cutting edge of the cutter 52 can form the slits on the strip-shape softened resin sheet "S". That is, in FIG. 5, by the air pressure introducing from the upper air pressure port 54-2 of the air cylinder 54 (the opposite direction of the arrow "b" in FIG. 5) and the air pressure exhausting from the lower air pressure port 54-1 of the air cylinder 54 (the opposite direction of the arrow "a" in FIG. 5), in FIG. 6, the piston rod 56 is extended in the downward direction, the cutting edge of the cutter 52 downwardly moves to the strip-shape softened resin sheet "S" and the sharp cutting edge moves in the arrow "f" direction and penetrates the strip-shape softened resin sheet "S". Since the cutter 52 which continues from the cutting edge 52-1 to the cutting portion 52-2 is directed to the moving direction "f" (see also, FIG. 8), as shown in FIG. 7, the cutter 52 moves on the strip-shape softened resin sheet "S" and forms the slit "Ca" parallel to the moving direction on the strip-shape softened resin sheet "S". The lateral direction movement of the cutter 52 by the rotation of the rotational axis 76-1 of the servo motor 76 changes the slit direction in accordance with the movement of the strip-shape softened resin sheet "S". When the cutter 52 moves in the left direction, the slant slit shown by the line "Cb" in FIG. 7 is formed. When forming the slant slit "Cb", the cutting portion 52-2 of the cutter 52 is slightly slant from the facing position against the cutting direction (the moving direction). Since the strip-shape softened resin sheet "S" which is a cutting object becomes softened by warming, the strip-shape softened resin sheet "S" does not substantially become the cutting resistance of the cutter 52 and the smooth cutting can be performed.

Figure 10:
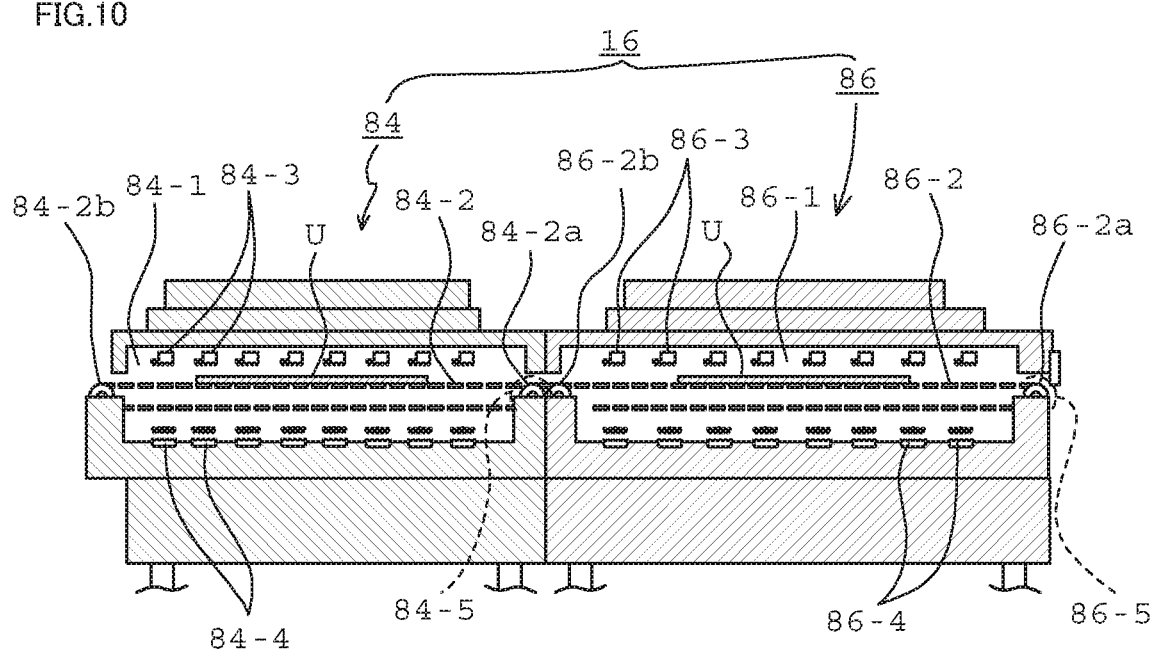
FIG. 10 is a schematic cross-sectional view showing a configuration of a heating machine.

In FIG. 1, the heating machine 16 of the present invention which controls the temperature suitable for press-molding the unit resin sheet "U" obtained by the cutting unit 14 comprises the first heating furnace 84 and the second heating furnace 86 which are continuously disposed in the conveying direction of the unit resin sheet "U". As shown in FIG. 10, the first heating furnace 84 comprises a heating chamber 84-1, a conveyor 84-2 which is disposed in the heating chamber 84-1 and conveys the unit resin sheet "U", a series of the infrared heaters 84-3 which are opposite to the conveyor 84-2 and are disposed on the upper surface of the heating chamber 84-1, and a series of the infrared heaters 84-4 which are disposed on the lower surface of the heating chamber 84-1. The conveyor 84-2 is wound between the driving pulley 84-2a and the driven pulley 84-2b and the rotational axis of the driving pulley 84-2a is connected to the driving motor 84-5 which is schematically shown. The wavelengths of the radiation light of the infrared heaters (the ceramic heater or the like) 84-3 and 84-4 are in a far-infrared region, for example, in a range of 10 [μm] to 20 [μm]. As described below, the unit resin sheet "U" is continuously conveyed on this conveyor 84-2. In this time, the conveying velocity of the unit resin sheet "U" by the conveyor 84-2 is set to, for example, 1.0 [m/s]. When the unit resin sheet "U" which is continuously heated by relatively low energy radiation in the far-infrared region is conveyed from the first heating furnace 84 to the second heating furnace 86, the temperature of the unit resin sheet "U" is controlled in a range of 125 degrees Celsius to 135 degrees Celsius which is slightly lower than the temperature suitable for press-molding the unit resin sheet "U" by the press-molding machine 20. Performing the previous process of forming the slits and cutting the strip-shape softened resin sheet "S" to the unit resin sheet "U", when the unit resin sheet "U" enters the first furnace 84, the temperature of the unit resin sheet "U" is in a range of 115 degrees Celsius to 125 degrees Celsius. By the heating process which is moderately occurred by the infrared ray having the relatively long wavelengths in the far-infrared region using the infrared heaters 84-3 and 84-4 in the first heating furnace 84 in which the unit resin sheet "U" is continuously conveyed, the temperature of the unit resin sheet "U" is controlled in a range of 125 degrees Celsius to 135 degrees Celsius. That is, the main object of the first heating furnace 84 is to heat the unit resin sheet "U", and the additive object is to keep the uniform temperature of the unit resin sheet "U" over the entire surface by relatively low energy radiation in the far-infrared region before heating the unit resin sheet "U" in the second heating furnace 86.

The unit resin sheet "U" which is heated by the first heating furnace 84 is conveyed to the second heating furnace 86. The second heating furnace 86 comprises a heating chamber 86-1, a conveyor 86-2 which is disposed in the heating chamber 86-1 and conveys the unit resin sheet "U", a series of the infrared heaters 86-3 which are opposite to the conveyor 86-2 and are disposed on the upper surface of the heating chamber 86-1, and a series of the infrared heaters 86-4 which are disposed on the lower surface of the heating chamber 86-1. The wavelengths of the radiation light of the respective infrared heaters (the ceramic heater or the like) 86-3 and 86-4 are in a middle-infrared region, for example, in a range of 5 [μm] to 10 [μm]. The conveyor 86-2 is wound between the driving pulley 86-2a and the driven pulley 86-2b and the rotational axis of the driving pulley 86-2a is connected to the driving motor 86-5 which is schematically shown. The heating of the unit resin sheet "U" by the infrared heaters 86-3 and 86-4 in the second furnace 86 is performed in a state that the unit resin sheet "U" is fixed. The unit resin sheet "U" is rapidly heated by the infrared ray having the relatively short wavelengths in the middle-infrared region and the temperature of the unit resin sheet "U" after heating is controlled in a range of 130 degrees Celsius to 160 degrees Celsius. This controlled temperature is appropriately selected depending on the molded part which is molded by press-molding. The heating in the middle-infrared region in a state that the unit resin sheet "U" is stopped is performed in the extremely short time, for example 15 [sec], the desired temperature of the unit resin sheet "U" can be obtained and this heating can contribute to improve the product efficiency of the resin sheet continuous pressing method according to the present invention. In the configuration of the heating furnace in the conventional resin sheet continuous pressing method by the applicant, the heating method by the infrared ray in the far-infrared region is used for heating the unit resin sheet "U". In this case, the heating time is needed for about 60 [sec] in the unit resin sheet "U" whose area is about 1500 [mm]×about 2000 [mm] and whose thickness is 1.6 [mm]. The time which is required for manufacturing one molded product by the resin sheet continuous pressing method (=the cycle time "ST") is limited to the heating time in the heating furnace. In the new structure of the heating machine 16 according to the present invention, the cycle time "ST" can be set to 20 [sec] and the productivity is remarkably improved.

The conveyance of the unit resin sheet "U" from the cutting unit 14 to the press-molding machine 20 via the heating machine 16, the transportation between the first heating furnace 84 and the second heating furnace 86 and the transportation operation to the press-molding machine 20 which is disposed at the downstream side will be described. The unit resin sheet "U" served from the cutting unit 14 is conveyed to the first heating furnace 84. The unit resin sheet "U" is continuously heated in the first heating furnace 84. Basically, the conveyor 84-2 continuously moves with a constant low velocity. In order to rapidly move the conveyor 84-2 for the carrying-in operation of the unit resin sheet "U", the rotational velocity of the driving motor 84-6 used in the conveyor 84-2 can rapidly be increased. Basically, the rapid heating of the unit resin sheet "U" in the second heating furnace 86 is performed in a state that the conveyor 86-2 is stopped. In order to carry-in the unit resin sheet "U" from the first heating furnace 84 and transport the unit resin sheet "U" to the press-molding machine 20 which is disposed at the downstream side, the driving motor 86-5 can rapidly rotate. The rapid conveying velocity of the conveyor 84-2 in the first heating furnace 84 is the same as that of the conveyor 86-2 for the second heating, for example, 10 [m/s].

FIGS. 11A, 11B, 11C, 11D, 11E, 12A, 12B, 12C and 12D schematically show the cooperative operation of the process for transporting the unit resin sheet "U" from the cutting machine 44 to the press-molding machine 20 via the first heating furnace 84 and the second heating furnace 86. FIG. 11A shows a state that the tip of the strip-shape softened resin sheet "S" is conveyed to the first heating furnace 84. In this time, the conveying velocity of the conveyor 84-2 is the same as that of the strip-shape softened resin sheet "S" (the rotational velocity of the driving motor 84-5 is Low). The rapid heating of the unit resin sheet "U" is performed on the stopped conveyor 86-2 in the second heating furnace 86.

FIG. 11B shows a state that the strip-shape softened resin sheet "S" is further conveyed in the first heating furnace 84 by the conveyor 84-2 and the unit resin sheet "U" is conveyed on the conveyor 84-2 with the low velocity. The rapid heating of the unit resin sheet "U" is continued on the stopped conveyor 86-2 in the second heating furnace 86.

FIG. 11C shows the cutting of the strip-shape softened resin sheet "S" by the cutting machine 44 (at a timing $t_c$ of FIG. 12A) and the cutting machine 44 cuts the strip-shape softened resin sheet "S" to the unit resin sheet "U". At the timing $t_1$ in which the time is slightly elapsed after cutting (this time is measured by the timer which is initiated at the cutting time $t_c$), the conveyor 84-2 of the first heating furnace 84 switches from the low velocity driving (the rotational velocity of the driving motor 84-5=Low) to the high velocity driving (the rotational velocity of the driving motor 84-5=High) for a moment (the extremely short time, for example, 0.5 [sec]), as shown in FIG. 11D, the unit resin sheet "U" on the conveyor 84-2 is rapidly conveyed to the middle position of the first heating furnace 84. At this timing (the timing $t_2$ in FIG. 12B (this timing is measured by the above timer)), the conveyor 84-2 is returned from the high velocity driving (the rotational velocity of the driving motor 84-5=High) to the normal low velocity driving (the rotational velocity of the driving motor 84-5=Low). In this way, the unit resin sheet "U" is gradually heated in the first heating furnace 84 under the low velocity movement and is rapidly heated in the second heating furnace 86 under the stopping state.

At the timing $t_3$ in which the required heating time in the second heating furnace 86 is measured by the timer (FIG. 12C), the driving motor 86-5 of the conveyor 86-2 in the second heating furnace 86 switches from the stopping state to the high velocity driving (the rotational velocity=High). As shown by the arrow "m", the stopped unit resin sheet "U" on the conveyor 86-2 begins to be transported to the conveyor 18-2 of the manipulator 18 for transporting to the press-molding machine 20. The conveyor 18-2 begins to rotate with the high conveying velocity which is the same as the conveying velocity of the conveyor 18-2 at the timing $t_4$ which is slightly delayed from the timing $t_3$ (FIG. 12D).

At the timing in which the conveyor 86-2 of the second heating furnace 86 begins to convey the unit resin sheet "U" with the high velocity, as shown in FIG. 11E, the upstream end of the unit resin sheet "U" which is placed on the conveyor 84-2 in the first heating furnace 84 in FIG. 11D is left from the conveyor 84-2, the downstream end of the unit resin sheet "U" has already been placed on the conveyor 86-2 in the second heating furnace 86 and the unit resin sheet "U" is conveyed with the high velocity. At the timing $t_5$, the driving motor 86-5 of the conveyor 86-2 switches from the high velocity driving (the rotational velocity=High) to the stopped state. As shown in FIG. 11A, the unit resin sheet "U" which is transported to the conveyor 86-2 is stopped at the middle position of the second heating furnace 86 and the heating to the unit resin sheet "U" at the stopped state in the second heating furnace 86 is started.

The unit resin sheet "U" which is transported to the conveyor 18-2 of the manipulator 18 arrives at the specified position of the conveyor 18-2 at the timing $t_6$ (in FIG. 12D), is sucked and held on the suction cup 18-1 of the manipulator 18 (in FIG. 1) (see also, FIG. 11A) and is press-molded by the press-molding machine 20. A sensor 88 for detecting the arrival to the specified position of the conveyor 18-2 of the manipulator 18 is disposed (see, FIG. 11E). (The sensor 88 is necessary for transporting the unit resin sheet "U" to the desired position of the press-molding machine 20 by the manipulator 18.) When the sensor 88 detects the arrival of the unit resin sheet "U" to the specified position of the conveyor 18-2, the timer is cleared and then the operations from FIG. 11A to FIG. 11E are repeated. In the operations from FIG. 12A to FIG. 12D, the timer is initiated by detecting the cutting of the strip-shape softened resin sheet "S". (The sensor (not shown) which detects the completion of the cutting operation of the strip-shape softened resin sheet "S" is disposed for initiating the timer.) The timings $t_1$ to $t_5$ are measured by the timer and the timer is cleared when the sensor 88 detects that the unit resin sheet "U" has been placed at the specified position on the conveyor 18-2. Since the initiating (the timing $t_c$) and the stopping (the timing $t_6$) of the timer are determined by the sensor, the conveying operation of the unit resin sheet "U" in the first heating furnace 84 and the second heating furnace 86 shown in FIGS. 12A to 12D can surely be realized without stepping-out.

In FIGS. 12A, 12B, 12C and 12D, the time between the cutting timing $t_c$ from the strip-shape softened resin sheet "S" to the unit resin sheet "U" and the next cutting timing $t_c$ is set to the cycle time "ST" of the press molded part molding line in the present embodiment. A series of the press-molding processes of the unit resin sheet in the press-molding machine are performed within the cycle time "ST". The stopping time "AT" of the second heating furnace 86 in the cycle time "ST" becomes the rapid heating time in a stopping state of the unit resin sheet "U" in the second heating furnace 86.

In the present invention, the heating machine 16 divides into the first heating furnace 84 and the second heating furnace 86. The above configuration can achieve the following features. In order to form the slits and cut the unit resin sheet "U", the resin temperature is lowered. In the first heating furnace 84, by moderately and continuously heating the unit resin sheet "U" in the cycle time, the resin temperature can increase up to the desired temperature and the overall unit resin sheet "U" can uniformly be heated and be kept to the desired temperature. Then, in the second heating furnace 86, when the unit resin sheet "U" is the stopped state, the unit resin sheet "U" is rapidly heated by using the middle-infrared ray within the short time and can arrive at the optimal resin temperature for the press-molding process. Accordingly, the second heating furnace 86 can perform the required heating within a short time with a margin to the cycle time and the heating time can be shortened to 15 [sec] ("AT" in FIG. 12C). Ina case of the conventional heating furnace, the cycle time of the unit resin sheet "U" whose area is 1500 [mm]×2000 [mm] and whose thickness is 1.6 [mm] is limited to about 60 [sec] because of the restriction of the heating time. In the present embodiment according to the present invention, the cycle time can be shortened to about 20 [sec]. That is, the heating method of the present invention can realize that the production speed is three times higher than that of the prior art.

Next, the molding operation of the press molded part "P" in the press-molding machine 20 will be described. The unit resin sheet "U" which is heated by the first heating furnace 84 and the second heating furnace 86 in the heating machine 16 and increases the temperature up to the optimal temperature for press-molding is mounted on the male mold 20-1 of the mold-opened press-molding machine 20. The female mold 20-2 is lowered by the hydraulic pressure cylinder 20-3 and the unit resin sheet "U" is press-molded in a mold cavity shape between the male mold 20-1 and the female mold 20-2 in the mold-clamped state. In the present embodiment, as shown in FIG. 2A, the molded part "P" which is integrated with the left and right fender protectors for front wheels of the vehicle by press-molding the unit resin sheet "U" is obtained. After mold-opening, the molded part "P" is ejected by the manipulator 22 and is conveyed to the conveyor 24-1 of the process line 24. A series of the processes for conveying the unit resin sheet "U" to the mold, mold-clamping, mold-opening and ejecting the press molded part are performed within the cycle time, related to FIGS. 12A to 12D.

The molding operation according to the present embodiment of the present invention in the press-molding machine 20 will be described in detail. When press-molding, it is necessary that the unit resin sheet "U" smoothly moves in accordance with the mold shape. In the present embodiment, the molded product "P" has the plural high vertical walls "W" and the plural embossment portions "E". When the smooth inflow of the resin is prevented at these portions, the concern for generating the local thin portions is existed. In the present embodiment of the present invention, the slits $C_1$, $C_2$, $C_3$, $C_4$ and $C_5$ are formed at the portion $P_3$ of the continuous resin sheet "S" in which the material therein is out of the range of the product (the fender protectors $P_1$ and $P_2$ in a case of the present embodiment) when press-molding the unit resin sheet "U" after cutting the continuous resin sheet "S" and becomes a scrap so that the resin material is smoothly moved to the portion in which the resin is extended in the mold when press-molding. That is, FIG. 13A shows a state that the slits $C_1$, $C_2$, $C_3$, $C_4$ and $C_5$ are formed on the strip-shape softened resin sheet "S" by the slit forming machine 50. After cutting the strip-shape softened resin sheet "S" to the unit resin sheet "U" by the cutting machine 44, the portions of the fender protectors $P_1$ and $P_2$ which become the product in the molded part which is molded by the press-molding machine 20 are shown by imaginary lines in FIG. 13A. The slits $C_1$, $C_2$, $C_3$, $C_4$ and $C_5$ are formed at the portion in which the material therein is out of the range of the fender protectors $P_1$ and $P_2$ in the molded part which is molded by the press-molding machine 20 and becomes a scrap, and the positions of the slits $C_1$, $C_2$, $C_3$, $C_4$ and $C_5$ are formed along the portions of the vertical walls and the embossment portions in which there exists a problem that the inflow of the resin of the fender protectors $P_1$ and $P_2$ which is the product in the molded part which is molded by the press-molding machine 20 is insufficient. As described in the explanation of FIG. 4, the slit forming machine 50 has three cutters 52 which can independently control in the upward, the downward and the width directions and are named as "A", "B" and "C". In the present embodiment, it is understood that the slit $C_5$ is formed by the cutter 52 which is positioned at "A" in FIG. 4, the slits $C_1$, $C_2$ and $C_3$ are processed by the cutter 52 which is positioned at "B" in FIG. 4 and the slit $C_4$ is formed by the cutter 52 is formed by the cutter 52 which is positioned at "C" in FIG. 4. After the slits $C_1$, $C_2$, $C_3$, $C_4$ and $C_5$ are formed by the slit forming machine 50, the strip-shape softened resin sheet "S" is cut along a front end edge $e_1$ and a rear end edge $e_2$ in the width direction by the cutting machine 44. As shown in FIG. 13B, the unit resin sheet "U" that the slits $C_1$, $C_2$, $C_3$, $C_4$ and $C_5$ are formed prior to press-molding the molded part "P" by the press-molding machine 20 is formed.

Figure 14A:
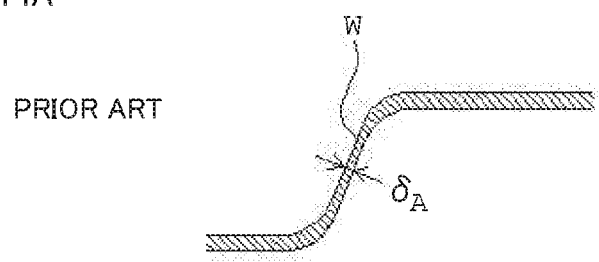
FIGS. 14A and 14B are a schematic cross-sectional view showing a thickness of a vertical wall portion in the press molded part.
Figure 14B:
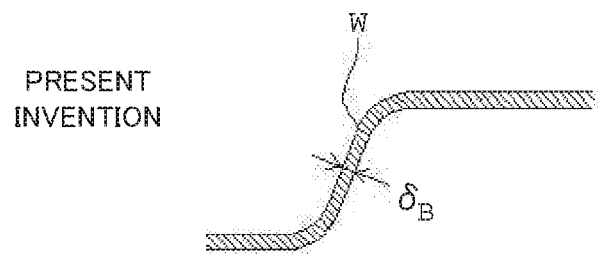

The function of the slits $C_1$, $C_2$, $C_3$, $C_4$ and $C_5$ will be described when the molded part "P" is press-molded by the press-molding machine 20. The resin is largely extended at the portions of the vertical walls "W" in the press molded part of FIG. 2A. Since the slits $C_3$ and $C_4$ are formed along the portions in which the material therein is proximate to the vertical walls "W" and becomes a scrap, the force that the slits $C_3$ and $C_4$ are opened in press-molding is applied to the part to be molded (FIG. 2A schematically shows a state that the slits $C_1$, $C_2$, $C_3$, $C_4$ and $C_5$ are opened in press-molding). The inflow property of the resin at the portions in which the vertical walls "W" are molded in press-molding is improved and the needed thickness at the portions of the vertical walls "W" after press-molding can surely be obtained. FIGS. 14A and 14B are a cross-sectional view schematically showing the portion of the vertical wall "W". In a case that the slits $C_3$ and $C_4$ are not formed, the smooth inflow of the resin at the portions of the vertical walls "W" is prevented and the thickness $\delta_A$ is thinner than the desired value. In the present embodiment of the present invention, since the smooth extension of the resin can be obtained by forming the slits $C_3$ and $C_4$, the thickness $\delta_B$ after press-molding which is equal to the desired value can surely be obtained. In the molded parts of the embossment portions "E" in FIG. 2A, since the expanding force is applied to the part to be molded at the slits $C_1$, $C_2$ and $C_3$ which are disposed in the middle portion, the inflow property of the resin to the mold cavity is improved and the desired thickness in the embossment portions "E" can be obtained.

EXPLANATION OF REFERENCE NUMERALS 10 molten resin extruder
14 cutting unit
16 heating machine
20 press molding machine
  20-1 male mold
  20-2 female mold
24 post-process line
26 hopper for feeding resin pellets
34 die
44 cutting machine
  44-1 fixed cutter
  44-2 moving cutter
50 slit forming machine
52 cutter
54 air cylinder
  54-1 lower air pressure port
  54-2 upper air pressure port
55 piston
60 horizontal moving member of air cylinder
62 support member of air cylinder
64, 66 sprocket wheel
68 looped chain
  68-1 chain pitch
70, 72 bracket
76 servo motor (A, B and C)
84 first heating furnace
  84-1 heating chamber of first heating furnace
  84-2 conveyor of first heating furnace
  84-3, 84-4 infrared heater of first heating furnace
  84-5 driving motor of conveyor of first heating furnace
86 second heating furnace
  86-1 heating chamber of second heating furnace
  86-2 conveyor of second heating furnace
  86-3, 86-4 infrared heater of second heating furnace
  86-5 driving motor of conveyor of second heating furnace
$C_1$, $C_2$, $C_3$, $C_4$, $C_5$ slits
P press molded part
  $P_1$, $P_2$ portions which become fender protectors of press molded part
  $P_3$ portion which becomes a scrap of press molded part
  W vertical wall of press molded part
  E embossment portion of press molded part
S strip-shape softened resin sheet
ST cycle time
U unit resin sheet

The invention claimed is:

1. A continuous press-molding method, comprising steps of:
  a forming process for forming a softened resin sheet longer in a lengthwise direction than a width direction by extruding a molten resin from a die;
  a cutting process for cutting said softened resin sheet to a unit of a resin sheet having a predetermined length;
  a unit resin sheet heating process for heating said unit of said resin sheet up to temperature which is suitable for press-molding; and
  a press-molding process for repeatedly performing a pressing process from said unit of said resin sheet to a press molded part which comprises steps of carrying said heated unit resin sheet to a press mold, press-molding said unit resin sheet to said press molded part by using said press mold and carrying said press molded part to a subsequent process in a cycle time,
  wherein said unit resin sheet heating process comprises steps of:
  a first heating process for gradually heating said unit resin sheet up to first temperature which is slightly lower than unit resin sheet temperature which is suitable for press-molding said unit resin sheet in a cycle time; and
  a second heating process for rapidly heating said unit resin sheet up to second temperature which is suitable for press-molding said unit resin sheet in a cycle time, after said first heating process.

2. The press-molding method according to claim 1, wherein said respective processes from said cutting process for cutting said unit resin sheet to said press-molding process are performed in a cycle time in a range of 15 [sec] to 25 [sec] in a case that a mixed resin of 40% to 60% of polypropylene resin and 60% to 40% of polyethylene resin is used as a material of said molten resin, temperature of said mixed resin when extruding is in a range of 190 degrees Celsius to 220 degrees Celsius, temperature of said resin sheet when cutting to said unit resin sheet is in a range of 115 degrees Celsius to 135 degrees Celsius, a size of said unit resin sheet is 700 [mm] to 1550 [mm]×1000 [mm] to 2300 [mm], temperature of said resin heated in said first heating process is in a range of 125 degrees Celsius to 135 degrees Celsius and temperature of said resin heated in said second heating process is in a range of 130 degrees Celsius to 160 degrees Celsius.

3. The press-molding method according to claim 1, wherein heating of said unit resin sheet in said first heating process is performed under a situation that said unit resin sheet is continuously conveyed with velocity of 0.02 [m/s] to 1.0 [m/s] and heating of said unit resin sheet in said second heating process is performed under a situation that said unit resin sheet is stopped.

4. The press-molding method according to claim 3, wherein a heat source which radiates infrared ray whose wavelengths are in a range of 10 [μm] to 20 [μm] in a far-infrared region is used for continuously heating said unit resin sheet in said first heating process and a heat source which radiates infrared ray whose wavelengths are in a range of 5 [μm] to 10 [μm] in a middle-infrared region is used for rapidly heating said unit resin sheet in said second heating process.

5. A heating machine of said unit resin sheet for performing the press-molding method according to claim 1, comprising:
a first heating furnace to perform heating in said first heating process; and
a second heating furnace to perform heating in said second heating process,
wherein said first heating furnace is disposed at a heating chamber and said second heating furnace is disposed in said heating chamber;
wherein each said first and second heating furnaces comprises a conveyor to convey said unit resin sheet, and an infrared heater which is disposed in said heating chamber along a conveying path of said unit resin sheet; and
wherein said infrared heater in said first heating furnace radiates infrared ray whose wavelengths are in a range of 10 [μm] to 20 [μm] in a far-infrared region and said infrared heater in said second heating furnace radiates infrared ray whose wavelengths are in a range of 5 [μm] to 10 [μm] in a middle-infrared region.

6. A heating machine of said unit resin sheet for performing the press-molding method according to claim 2, comprising:
a first heating furnace to perform heating in said first heating process; and
a second heating furnace to perform heating in said second heating process,
wherein said first heating furnace is disposed at a heating chamber and said second heating furnace is disposed in said heating chamber;
wherein each said first and second heating furnaces comprises a conveyor to convey said unit resin sheet, and an infrared heater which is disposed in said heating chamber along a conveying path of said unit resin sheet; and
wherein said infrared heater in said first heating furnace radiates infrared ray whose wavelengths are in a range of 10 [μm] to 20 [μm] in a far-infrared region and said infrared heater in said second heating furnace radiates infrared ray whose wavelengths are in a range of 5 [μm] to 10 [μm] in a middle-infrared region.

7. A heating machine of said unit resin sheet for performing the press-molding method according to claim 3, comprising:
a first heating furnace to perform heating in said first heating process; and
a second heating furnace to perform heating in said second heating process,
wherein said first heating furnace is disposed at a heating chamber and said second heating furnace is disposed in said heating chamber;
wherein each said first and second heating furnaces comprises a conveyor to convey said unit resin sheet, and an infrared heater which is disposed in said heating chamber along a conveying path of said unit resin sheet; and
wherein said infrared heater in said first heating furnace radiates infrared ray whose wavelengths are in a range of 10 [μm] to 20 [μm] in a far-infrared region and said infrared heater in said second heating furnace radiates infrared ray whose wavelengths are in a range of 5 [μm] to 10 [μm] in a middle-infrared region.

8. A heating machine of said unit resin sheet for performing the press-molding method according to claim 4, comprising:
a first heating furnace to perform heating in said first heating process; and
a second heating furnace to perform heating in said second heating process,
wherein said first heating furnace is disposed at a heating chamber and said second heating furnace is disposed in said heating chamber;
wherein each said first and second heating furnaces comprises a conveyor to convey said unit resin sheet, and an infrared heater which is disposed in said heating chamber along a conveying path of said unit resin sheet; and
wherein said infrared heater in said first heating furnace radiates infrared ray whose wavelengths are in a range of 10 [μm] to 20 [μm] in a far-infrared region and said infrared heater in said second heating furnace radiates infrared ray whose wavelengths are in a range of 5 [μm] to 10 [μm] in a middle-infrared region.

9. The heating machine according to claim 5, wherein said conveyor of said first heating furnace comprises a first conveyor driving mechanism to perform low velocity movement of said unit resin sheet for gradually heating said unit resin sheet, perform rapid velocity movement for carrying-in said unit resin sheet to said first heating furnace and perform movement for carrying-out said unit resin sheet to said second heating furnace, and
said conveyor of said second heating furnace comprises a second driving mechanism to stop said unit resin sheet during heating, perform rapid velocity movement for carrying-in said unit resin sheet from said first heating furnace and perform rapid velocity movement for carrying-out said unit resin sheet to a press-molding machine side after heating.

10. The heating machine according to claim 6, wherein said conveyor of said first heating furnace comprises a first conveyor driving mechanism to perform low velocity movement of said unit resin sheet for gradually heating said unit resin sheet, perform rapid velocity movement for carrying-in said unit resin sheet to said first heating furnace and perform movement for carrying-out said unit resin sheet to said second heating furnace, and said conveyor of said second heating furnace comprises a second driving mechanism to stop said unit resin sheet during heating, perform rapid velocity movement for carrying-in said unit resin sheet from said first heating furnace and perform rapid velocity movement for carrying-out said unit resin sheet to a press-molding machine side after heating.

11. The heating machine according to claim 7, wherein said conveyor of said first heating furnace comprises a first conveyor driving mechanism to perform low velocity movement of said unit resin sheet for gradually heating said unit resin sheet, perform rapid velocity movement for carrying-in said unit resin sheet to said first heating furnace and perform movement for carrying-out said unit resin sheet to said second heating furnace, and said conveyor of said second heating furnace comprises a second driving mechanism to stop said unit resin sheet during heating, perform rapid velocity movement for carrying-in said unit resin sheet from said first heating furnace and perform rapid velocity movement for carrying-out said unit resin sheet to a press-molding machine side after heating.

12. The heating machine according to claim 1, wherein said conveyor of said first heating furnace comprises a first conveyor driving mechanism to perform low velocity movement of said unit resin sheet for gradually heating said unit resin sheet, perform rapid velocity movement for carrying-in said unit resin sheet to said first heating furnace and perform movement for carrying-out said unit resin sheet to said second heating furnace, and said conveyor of said second heating furnace comprises a second driving mechanism to stop said unit resin sheet during heating, perform rapid velocity movement for carrying-in said unit resin sheet from said first heating furnace and perform rapid velocity movement for carrying-out said unit resin sheet to a press-molding machine side after heating.

13. A continuous molding apparatus of a press molded part, comprising:

an extruder to extrude a molten resin and form a softened resin sheet longer in a lengthwise direction than a width direction;

a cutting machine to cut said softened resin sheet which is extruded from said extruder, in a width direction, and make a unit of a resin sheet having a predetermined length;

a unit resin sheet heating machine to heat said unit resin sheet up to temperature suitable for press-molding; and a press-molding machine to press-mold said heated unit resin sheet to a press molded part, wherein said unit resin sheet heating machine comprises a first heating furnace to perform heating in a first heating process and a second heating furnace to perform heating in a second heating process;

wherein said first heating furnace is disposed at a heating chamber and said second heating furnace is disposed in said heating chamber;

wherein each said first and second heating furnaces comprises a conveyor to convey said unit resin sheet, and an infrared heater which is disposed in said heating chamber along a conveying path of said unit resin sheet; and wherein said infrared heater in said first heating furnace radiates infrared ray whose wavelengths are in a range of 10 [μm] to 20 [μm] in a far-infrared region and said infrared heater in said second heating furnace radiates infrared ray whose wavelengths are in a range of 5 [μm] to 10 [μm] in a middle-infrared region.

* * * * *